(12) United States Patent
Weir

(10) Patent No.: US 6,655,890 B1
(45) Date of Patent: Dec. 2, 2003

(54) APPARATUS FOR SEPARATING LAUNDRY ARTICLES

(76) Inventor: Henry John Weir, Woodcroft Close, Chepstow Gwent (GB), NP57HX ( * ) Notice: Subject to any disclaimer, the term of this patent is extended or adjusted under 35 U.S.C. 154(b) by 319 days.

(21) Appl. No.: 09/348,400

(22) Filed: Jul. 7, 1999

(51) Int. Cl.$^7$ ................................................ D06F 95/00
(52) U.S. Cl. ........................................ 414/13; 414/403
(58) Field of Search .......................... 414/13, 403, 401, 414/389, 618, 399

(56) References Cited

U.S. PATENT DOCUMENTS

| | | | |
|---|---|---|---|
| 4,029,221 A | * 6/1977 | Nakai et al. | ................. 414/401 |
| 4,036,365 A | * 7/1977 | Rosenfeld | .................... 209/73 |
| 4,447,972 A | 5/1984 | McCabe | |
| 4,943,198 A | 7/1990 | McCabe | |
| 4,979,868 A | 12/1990 | Ueda et al. | |
| 5,168,645 A | 12/1992 | Robin et al. | |
| 6,089,810 A | * 7/2000 | Heinz et al. | .................. 414/13 |

FOREIGN PATENT DOCUMENTS

| | | |
|---|---|---|
| DE | 43 30 911 A1 | 3/1995 |
| EP | 0 743 390 A1 | 11/1996 |
| EP | 0 848 102 A1 | 6/1998 |
| JP | 56-33315 * | 4/1981 ................. 414/399 |
| NO | 97448 * | 5/1958 .................. 414/13 |
| WO | WO 97/13914 | 4/1997 |

OTHER PUBLICATIONS

Kannegiesser; Pick-up Device PU 12 "The Separation and Transfer Device to High Performance Feeding Systems"; pp. 1–4.

* cited by examiner

*Primary Examiner*—Steven A. Bratlie
(74) *Attorney, Agent, or Firm*—Brinks Hofer Gilson & Lione

(57) ABSTRACT

There is provided an apparatus and methods for separating an article of laundry from a bundle of articles. The bundle is located in a truck which is clamped into a carriage by a clamping arm or attached to guide rails. The truck is moved by a suitable drive in a controlled manner beneath a grip device which is movable into and out of the truck. The grip device is mounted on a carriage which is movable upwards relative to a frame by a winch and downwards by gravity. The grip device picks the article from the bundle using a dual clamp structure and lifts the article up past an adjacent conveyor which is mounted so as to oscillate about a roller. An air jet means is also provided to blow the article into a nip defined between the conveyor belt and a spring loaded nip roller. Sensors are provided for sensing overload conditions for the conveyor and the grip device.

42 Claims, 15 Drawing Sheets

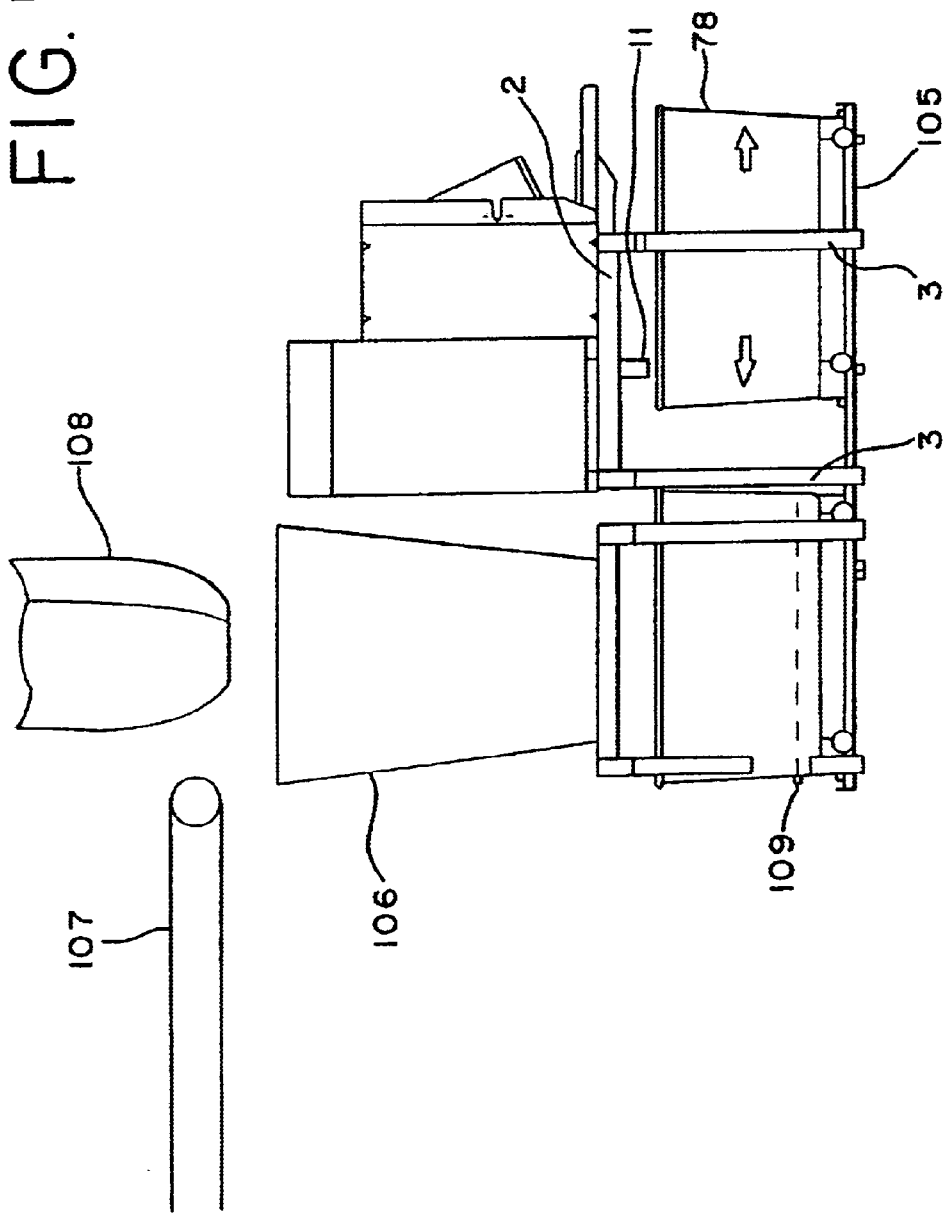

Figure 1:
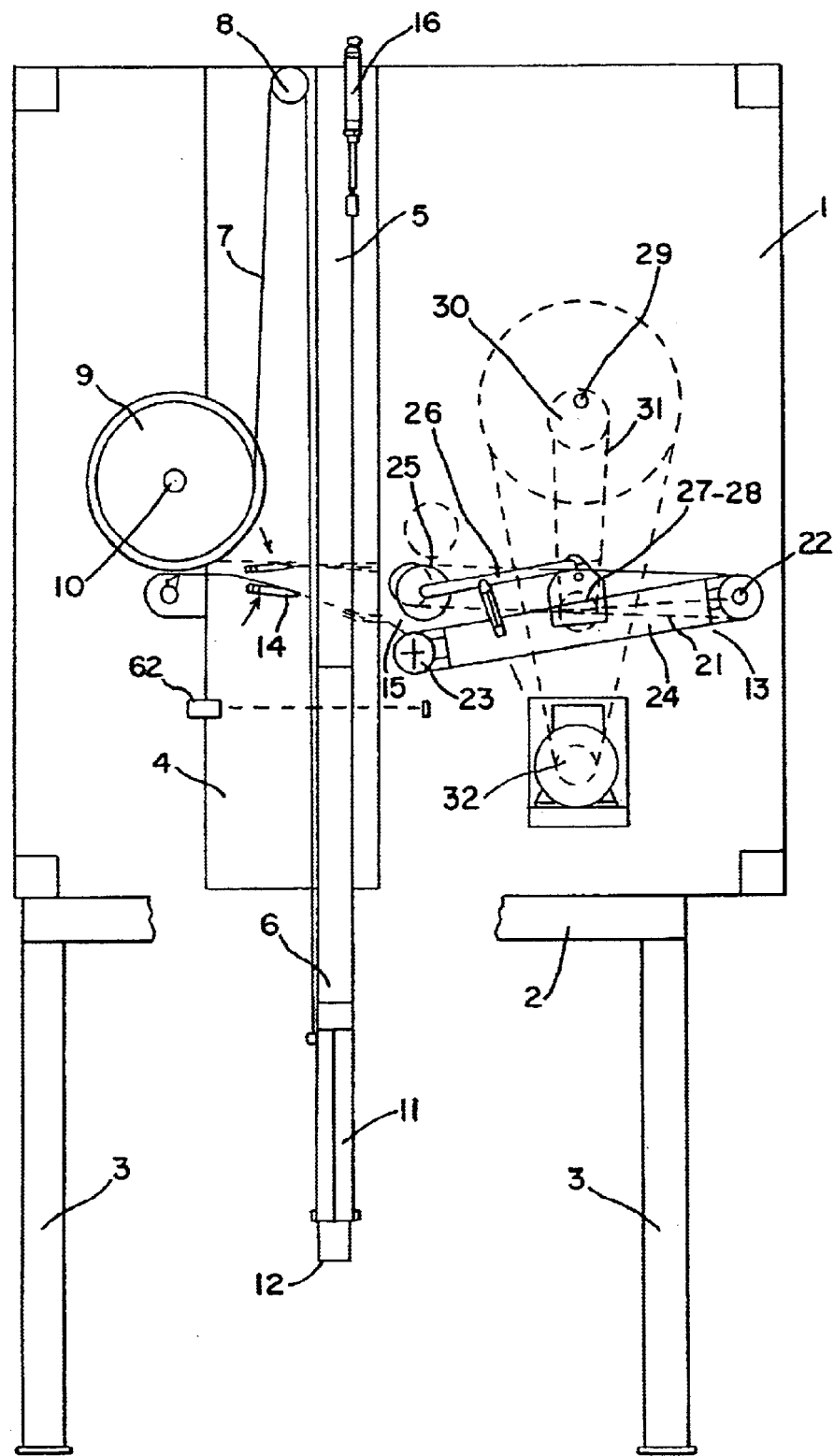

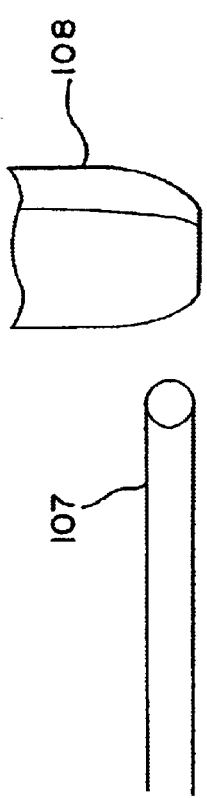
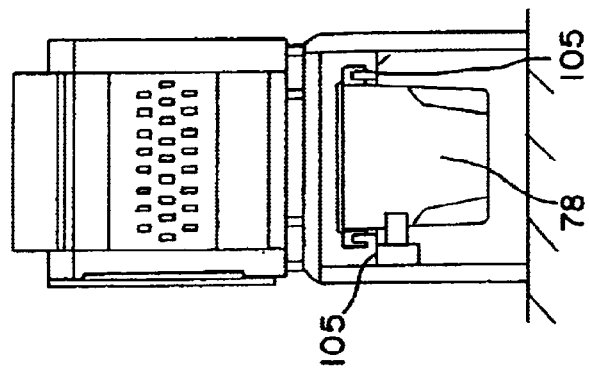

APPARATUS FOR SEPARATING LAUNDRY ARTICLES

This application claims the benefit of foreign priority pursuant to 35 U.S.C. §119 or §356 to British Patent Application Nos. 9814796.0, filed Jul. 8, 1998, and 9821713.6, filed Oct. 14, 1998.

The invention relates to apparatus for separating articles of laundry which are bundled together and discharged after the washing process in a modem laundry. The process and handling procedures described within this application mainly, but not exclusively, concern large laundry flatwork, namely: sheets, table covers and other similar rectangular textile articles.

After the washing and water extraction process, followed by a rotary tumbling process, which loosens up the articles, the bundles are discharged and onward conveyed by trucks or mechanical conveyors to the finishing departments where each piece is manually handled by the operators, who feed the items into the ironing machines. In order to increase the productive output and also to reduce the work effort of the operators, it is desirable to separate the articles from the bundle pile and then direct the pieces to the operators in a more handleable state.

Among the existing methods which are used to separate articles are those which employ grip and pickup mechanisms. These comprise a gripping device which is arranged for substantially vertical travel up and down and which is lowered to make random contact with the articles in the bundle pile. A pair of jaws are closed to grip a portion of the fabric and the mechanism is raised upwards to withdraw the article from the pile. At a predetermined height the article is released and directed on to conveyor means which will route it to the feeding machine operators.

For gripping mechanisms to effectively pick up and separate just one or two articles at a time it is necessary for the jaws to grip a relatively small portion of the fabric which does impose a danger of tearing the fabric when withdrawing from a heavily tangled pile. Alternatively jaws which are arranged to grip a substantial amount of fabric will tend to withdraw a greater number of articles with each pick up operation, consequently the process of separation is not efficient.

There are limitations with the existing systems regarding the degree of tangled laundry they can effectively process. The work loads in many laundries are transported in hand trucks which can be loaded to a depth in excess of 70 cms and here the bundle pile is compacted and heavily tangled.

According to one aspect of the present invention there is provided laundry separating apparatus for separating an article of laundry from a bundle of laundry articles, the apparatus comprising a frame, a drive connected with a laundry truck to moveably position the truck relative to the frame and allow positioning of the truck both away from and adjacent to the frame. In another embodiment of this aspect, the apparatus comprises a frame, a grip device mounted for guided movement towards and away from a bundle of laundry, a truck in which the laundry articles are, in use, located, drive means for moving said grip device towards and away from said laundry, moving means associated with the truck for causing the truck to move relative to the frame beneath the grip device during the operation of the apparatus.

Preferably the moving means moves the truck after a number of cycles of movement of the grip device towards and away from the bundle determined by control means, the grip device being actuated to grip an article of laundry at the lowermost point in its cycle of movement. In most arrangements the grip device moves substantially vertically towards and away from the truck, so as to suspend a gripped article of laundry.

In some arrangements the moving means comprises a carriage and the truck is wheeled for free movement on the ground and, in use, is releasably clamped relative to the carriage which is mounted on the frame for forward and backward movement relative thereto.

In other arrangements the moving means comprises guide means extending between a truck loading position and a laundry separating position below the grip device, the truck being mounted on the guide means such that movement of the truck relative to the guide means results in movement of the truck relative to the grip device. Conveniently the guide means comprises a pair of guide rails.

Ideally control means are provided to coordinate the movement of the grip device and the truck relative thereto. It is a preferred feature that the control means moves the truck relative to the grip device if the grip device fails to grip an article of laundry. Also, the control means moves the truck relative to the grip device if the apparatus is unable to extract an article and the article is released back into the bundle.

According to another aspect of the present invention there is provided laundry separating apparatus for separating an article of laundry from a bundle of laundry articles, the apparatus comprising a frame, a conveyor with a shaft pivotally mounted with the frame, a nip formed with the conveyor and a means for oscillating the conveyor and the nip about the shaft. In another embodiment, the apparatus comprises a frame, a clamp moveably connected with the frame along a first path of travel, a conveyor connected with the frame and offset from the first path of travel, and a nip formed with the conveyor adjacent to the first path of travel. In yet another embodiment of this aspect, the apparatus comprises a grip device mounted for guided movement towards and away from said bundle to extract said article of laundry from said bundle, a conveyor mounted adjacent the path of movement of said grip device, a nip roller mounted adjacent the conveyor to define therebetween a nip, transfer means for transferring a portion of said article of laundry into said nip, and control means for actuating the transfer means and actuating said grip device so as to release said article of laundry which is then conveyed by said conveyor.

Preferably said conveyor is adapted to oscillate towards and away from said bundle of laundry. In a preferred arrangement said conveyor is an endless belt conveyor extending between two rollers, the first of which is located adjacent the path of the grip device and the associated nip roller and the second of which is relatively remote from the path of the grip device, the second roller being driven in rotation and acting as the pivot for the oscillation of the conveyor.

It is a preferred feature that said transfer means comprises air jet means mounted on the other side of the movement path of the grip device to said conveyor and adapted to blow said portion of the article towards the nip. When the conveyor oscillates said air jet means are movably mounted so as always to be directed towards the nip between the conveyor and the nip roller.

Normally the nip roller is biased into engagement with the conveyor and in preferred embodiments sensing means are provided to detect a blockage in the nip of the conveyor, the sensing means being linked to the control means to actuate reversal of the conveyor to remove the blockage. Conveniently the sensing means comprises an encoder on the nip roller which encoder senses when the nip roller is no longer rotating in a laundry removal direction.

In some arrangements a further sensor is provided to detect the presence of the gripped suspended article of laundry, the sensor being linked to the control means to actuate the transfer mechanism and to release the article from the grip device. Preferably the further sensor also detects clearance of the removed blockage to resume forward movement of the conveyor and may comprise a photocell or a row of photocells.

According to yet another aspect of the present invention there is provided laundry separating apparatus for separating an article of laundry from a bundle of laundry, said apparatus comprising a casing, first and second clamp jaws mounted in the casing where the first jaws are substantially fixed in position relative to the second jaws. In another embodiment, the apparatus comprises a grip device mounted for guided movement towards and away from the bundle of laundry, drive means for lifting the grip device away from said bundle, and sensor means determining the lowermost point of the movement of the grip device towards the laundry so as to actuate the grip device to grip an article of laundry and to actuate the drive means to lift the grip device and the gripped article away from the bundle of laundry, the grip device having first and second pairs of gripping jaws, the first pair gripping a small part of the article of laundry and the second pair gripping a larger part of the article after the grip device has been moved a predetermined distance away from the bundle of laundry.

Preferably the jaws are pivotally mounted on a gripping carriage. In a preferred embodiment the axes of the jaw pivots are parallel to each other, the first jaws being mounted inside the second jaws.

Conveniently the drive means comprises a rotatable winch drum connected to said grip device by one or more belts/cables. In preferred arrangements the winch drum is driven by means of a pinion fixed thereto and a cooperating rack connected to a pneumatic cylinder, exhaustion of which allows the grip device to fall under gravity.

Ideally velocity regulating means are provided to slow the movement of the grip device as it approaches the bundle of laundry. In a preferred arrangement said velocity regulating means comprises a damping cylinder which is engaged at a predetermined point in the gravity movement of the grip device by an arm which extends from the rack. A further preferred feature is that a failsafe brake is provided for the winch drum, which brake is able, when actuated, to prevent the grip device from falling under gravity.

Preferably said sensing means comprises an encoder to detect lack of movement of the winch drum when the grip device is being moved away from the bundle to detect an overload condition thereby actuating the brake and releasing the grip device, and when the grip device falls under gravity to detect the lowermost point of movement of the grip device. Ideally the guided movement of the grip device is substantially vertical so as to suspend the gripped article of laundry.

According to further aspects of the invention, a laundry separating apparatus comprises a grip device mounted for guided movement towards and away from a bundle of laundry and a drive for lifting the grip device away from the bundle and allowing the grip device to fall due to gravity towards the bundle of laundry. In one embodiment of this aspect, a winch wheel with a belt connection with the gripping device connects a drive to the grip device. An apparatus comprising sensors for detecting overload conditions when separating a laundry article from a bundle is also provided. The sensor detects movement of a gripping device or a nip roller.

Other features are set out in the claims of the present application.

Figure 2:
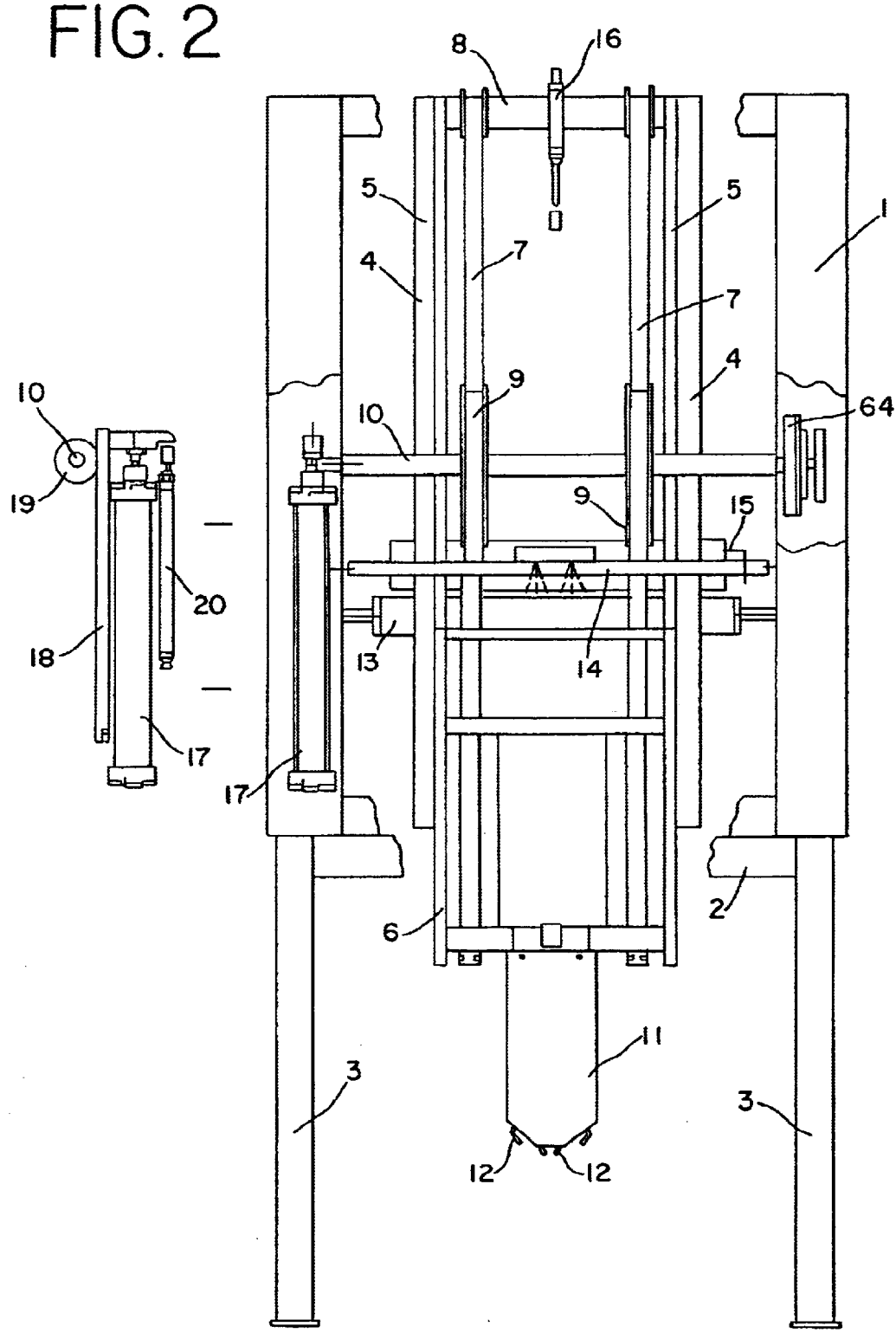
Figure 3:
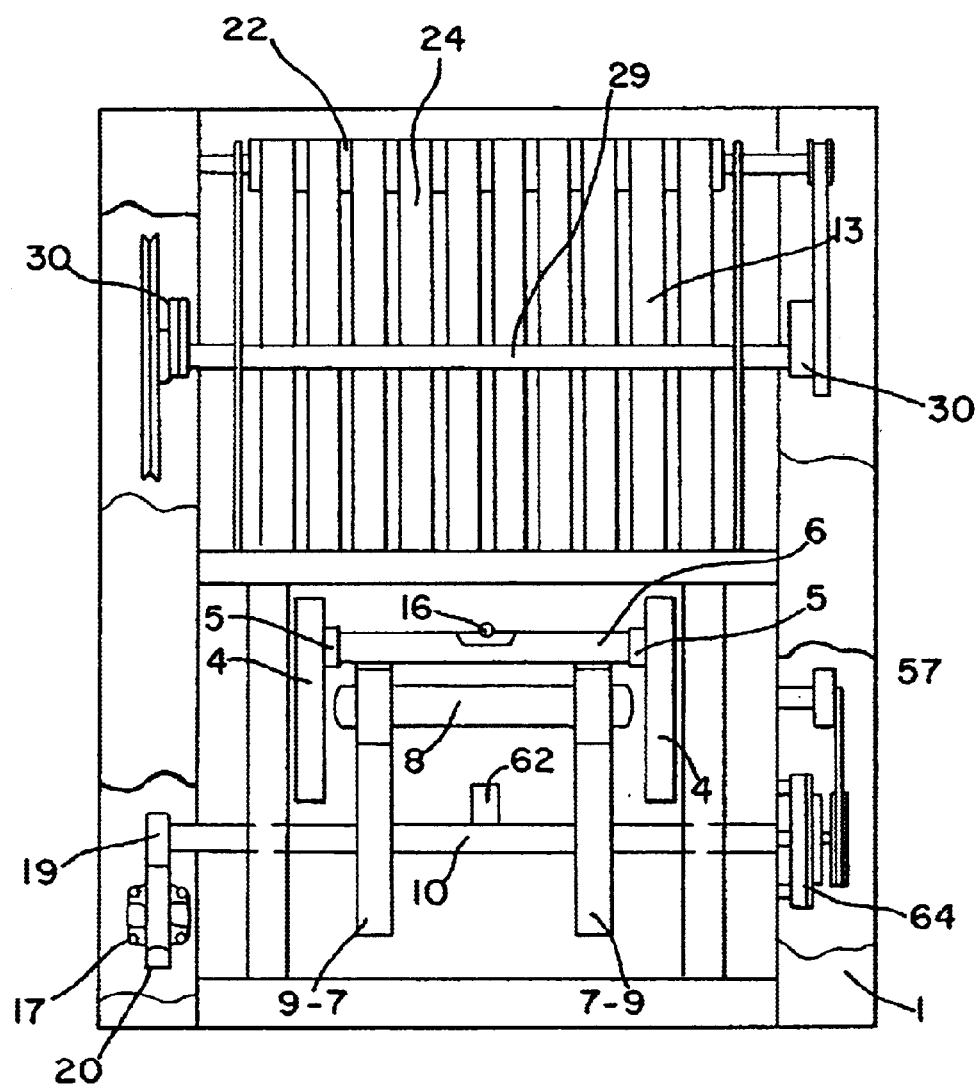
Figure 5:
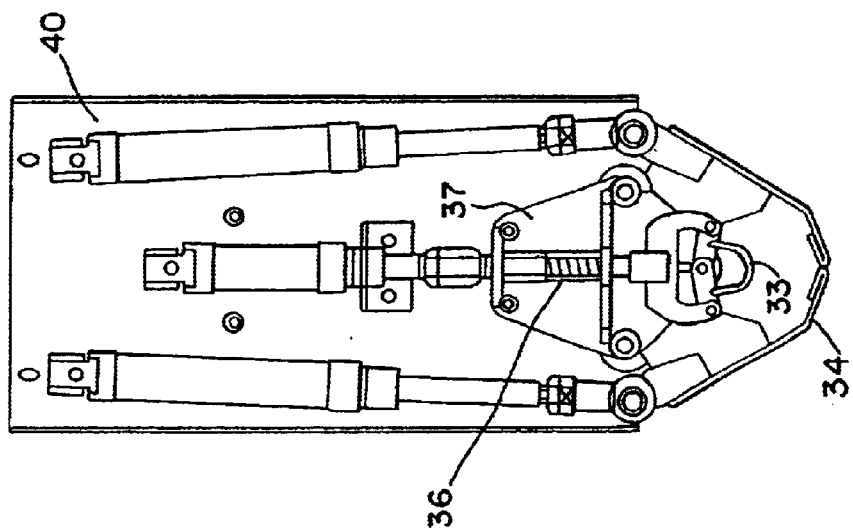
Figure 4:
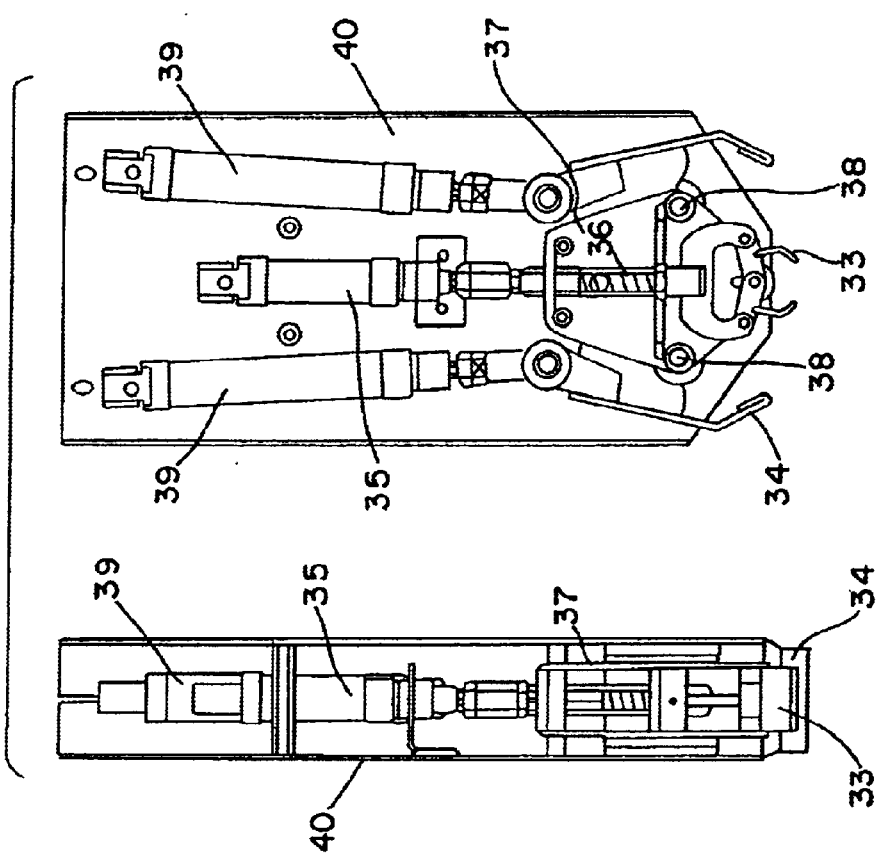
Figure 6:
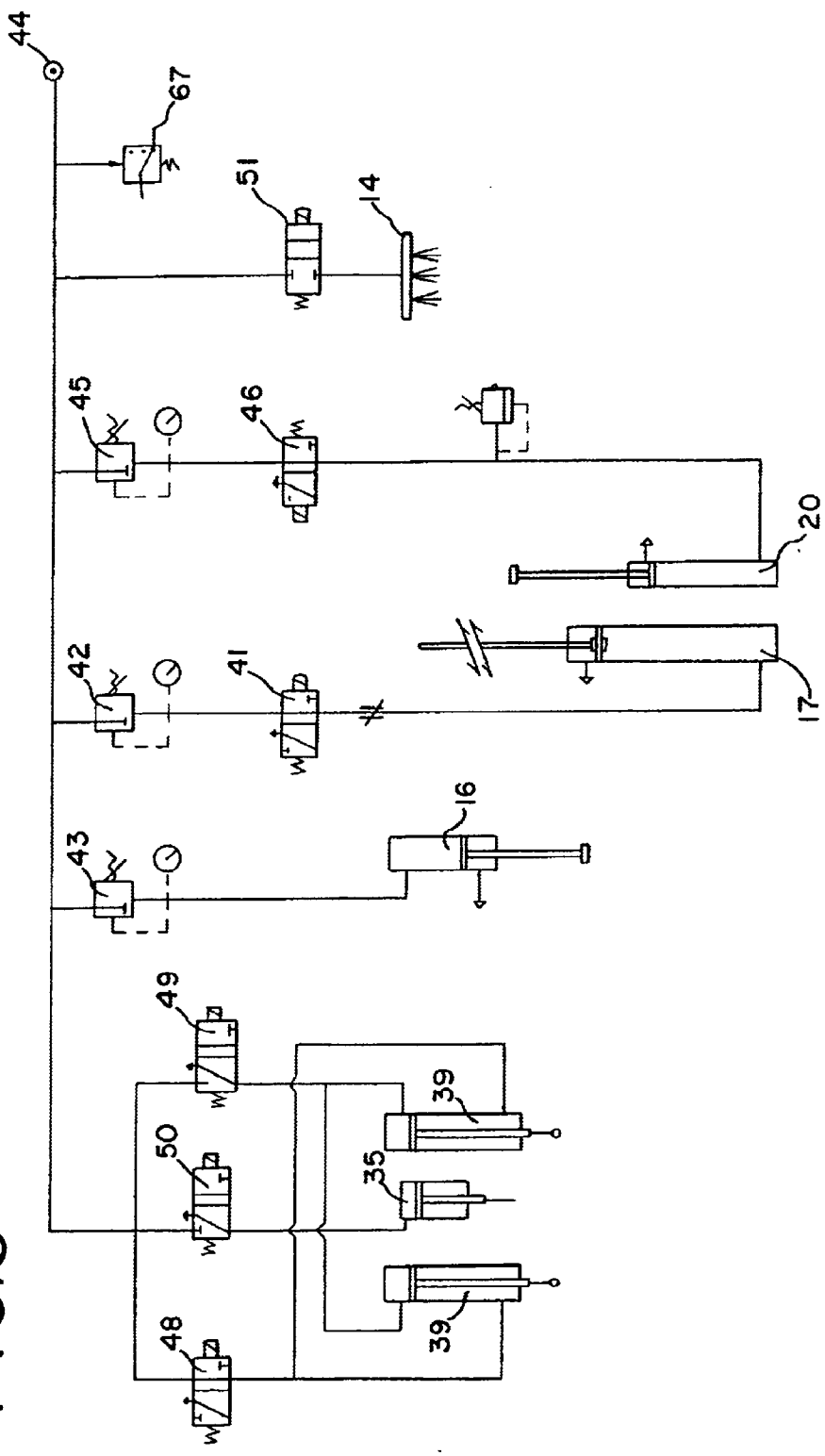
Figure 7:
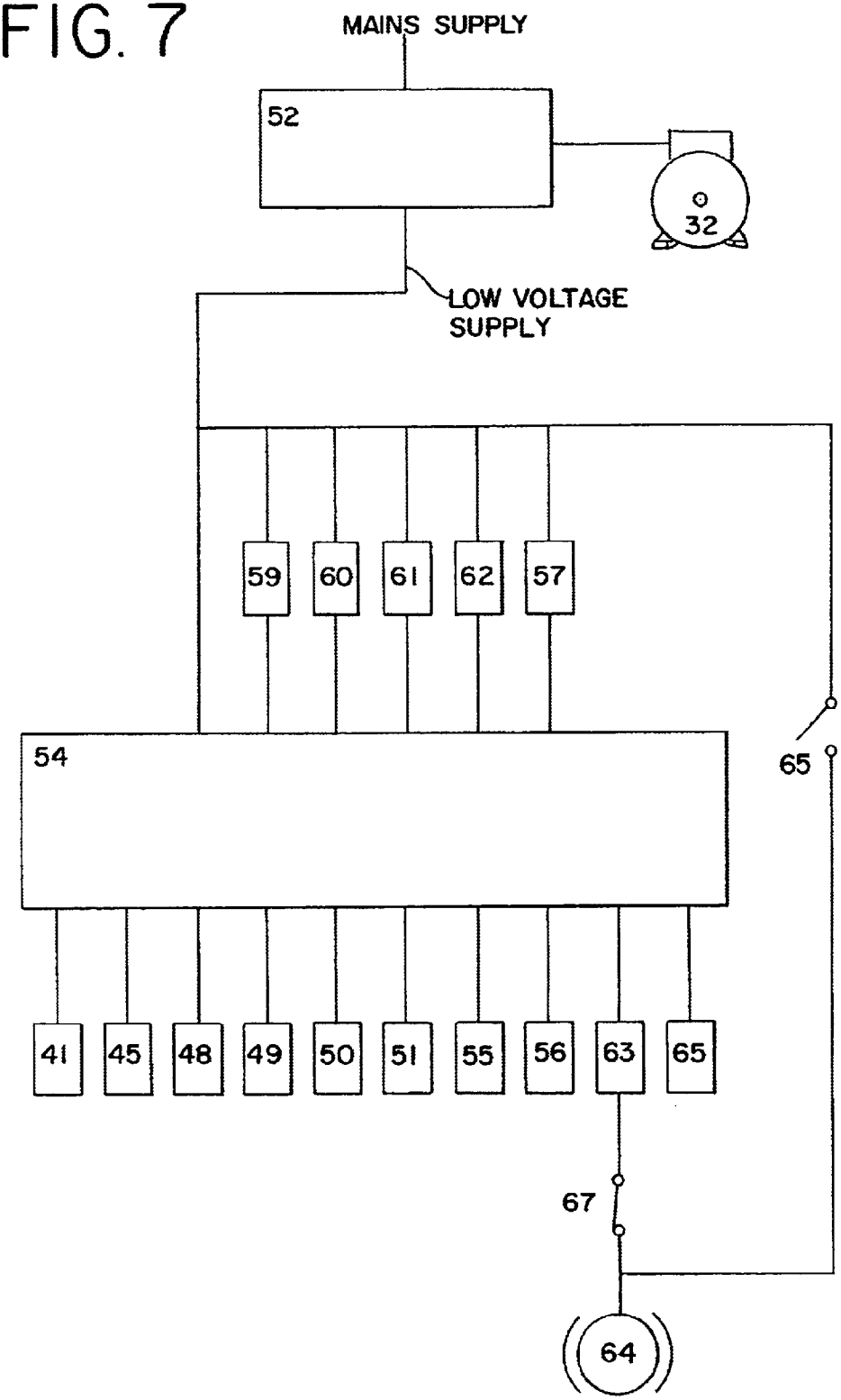
Figure 10:
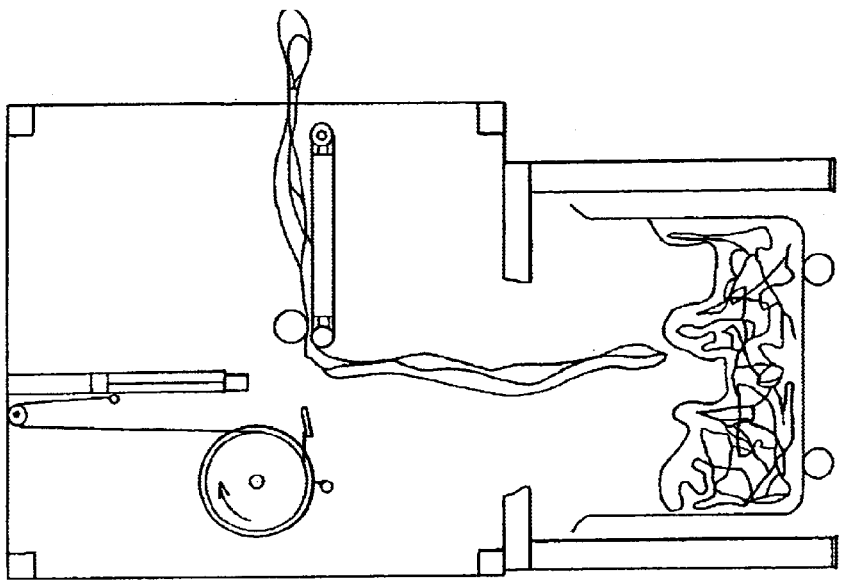
Figure 9:
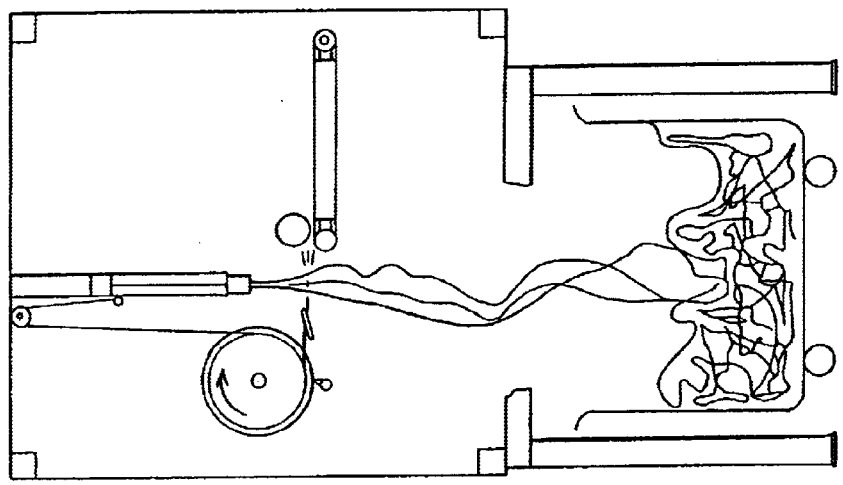
Figure 8:
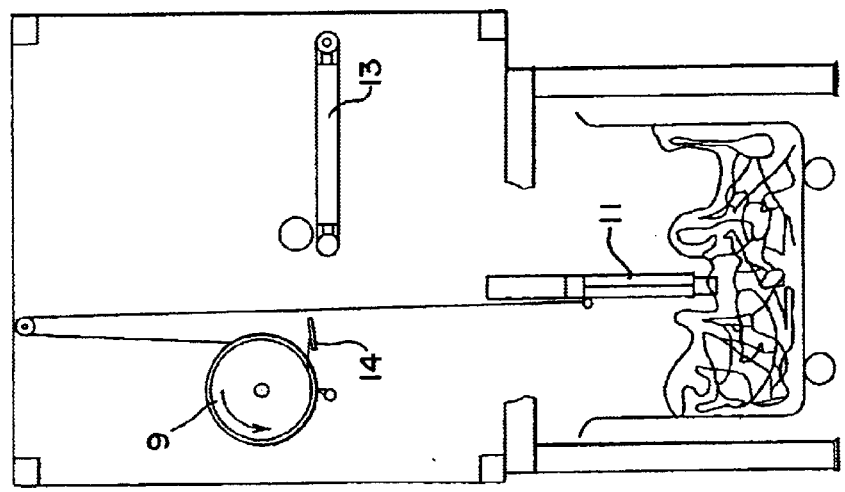
Figure 11:
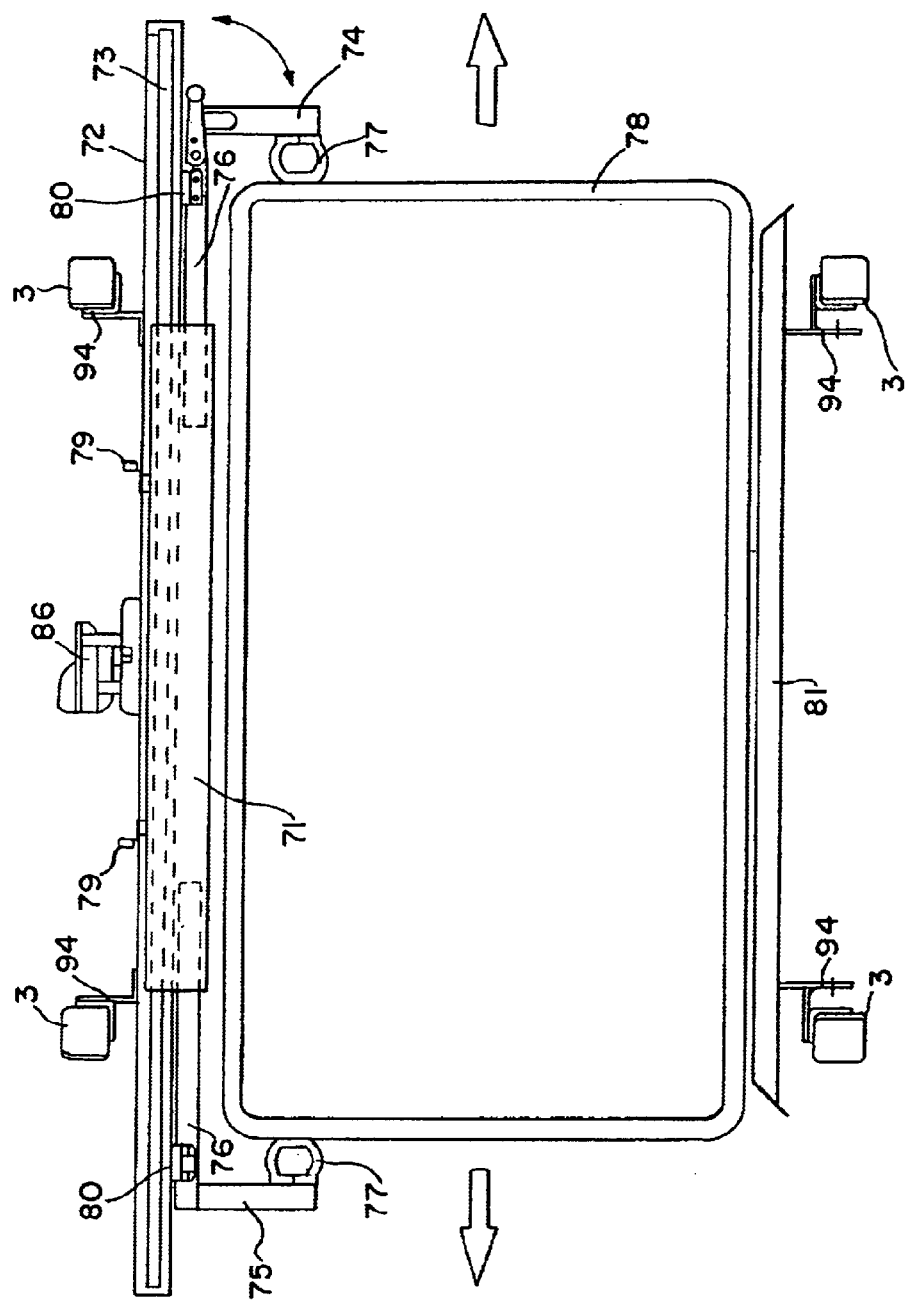
Figure 12:
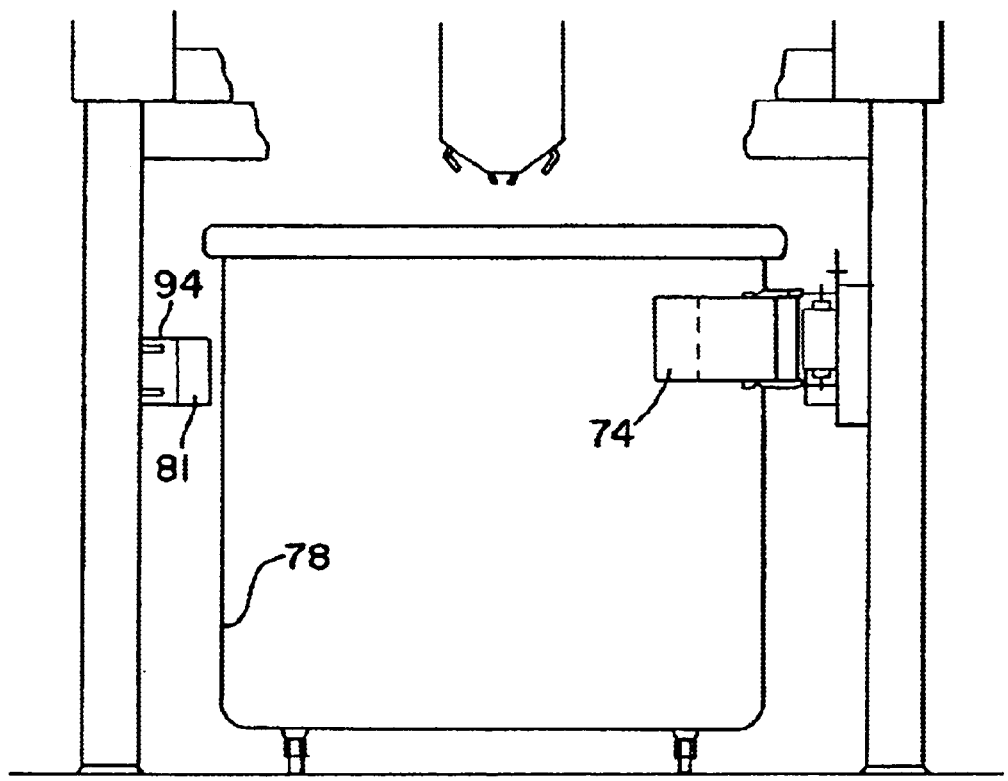
Figure 13:
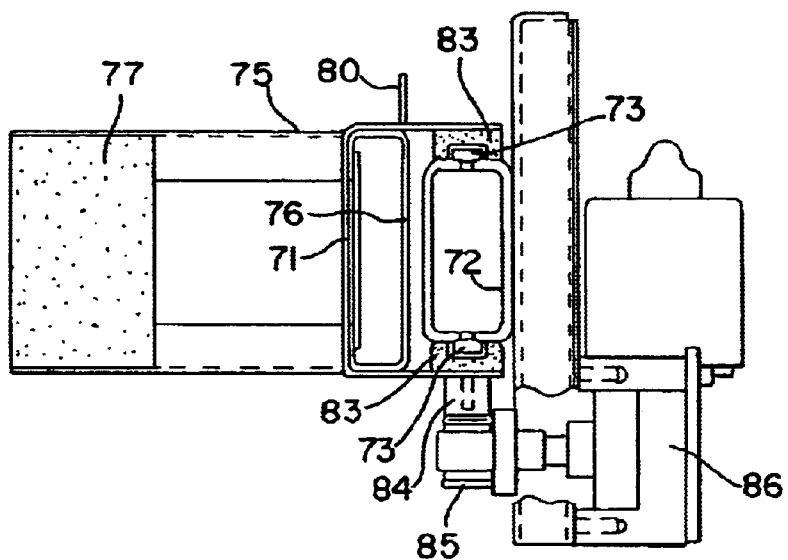
Figure 14:
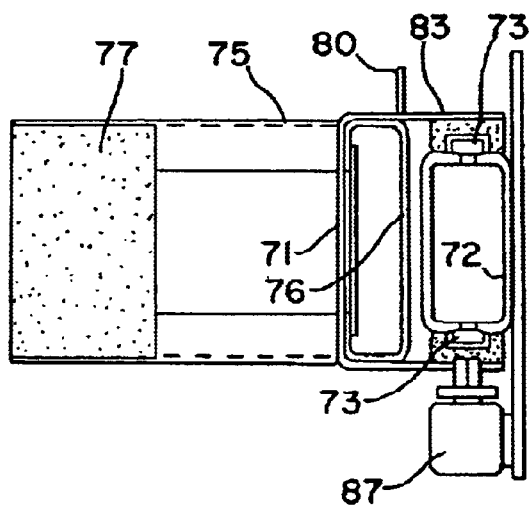
Figure 15:
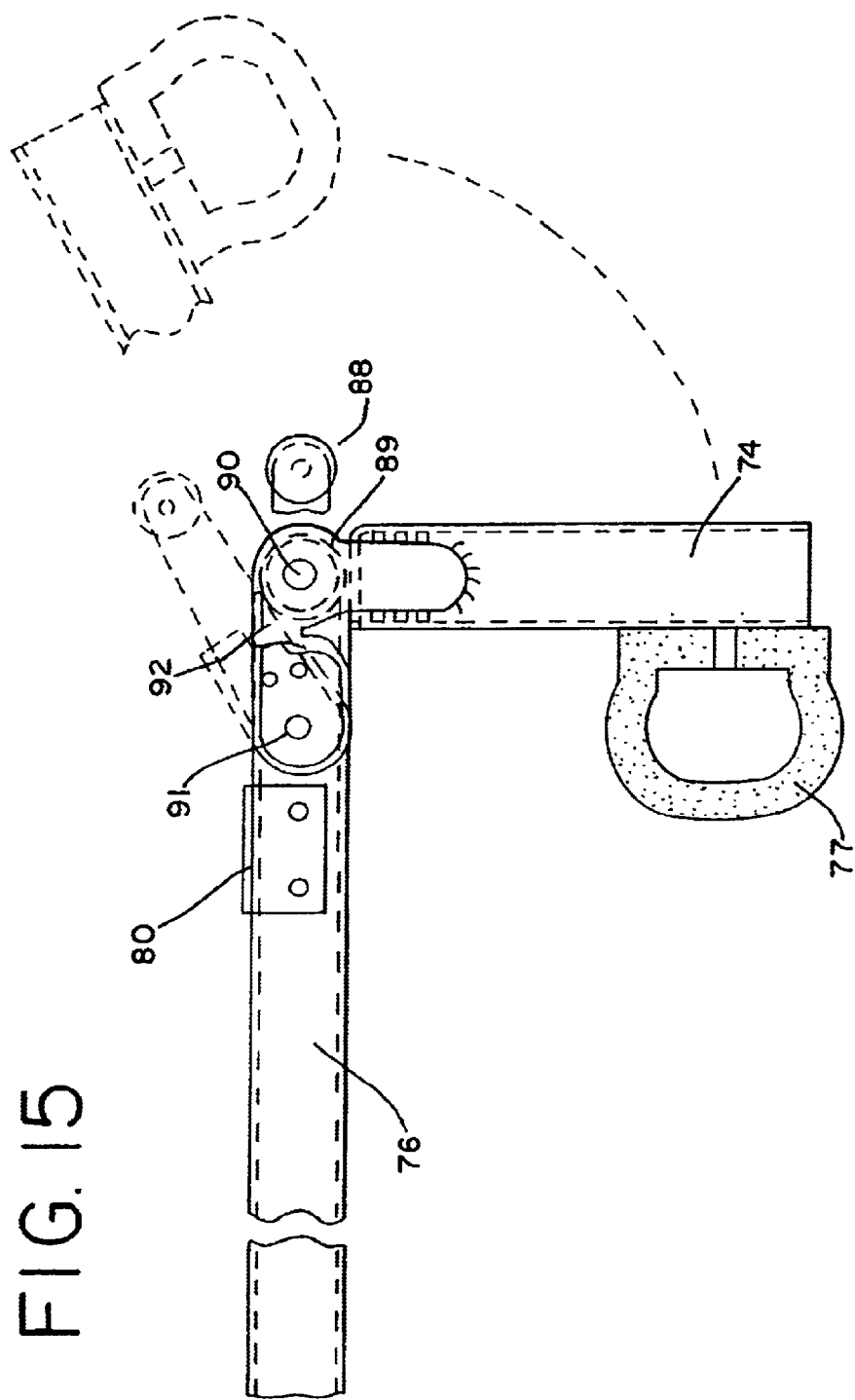
Figure 16:
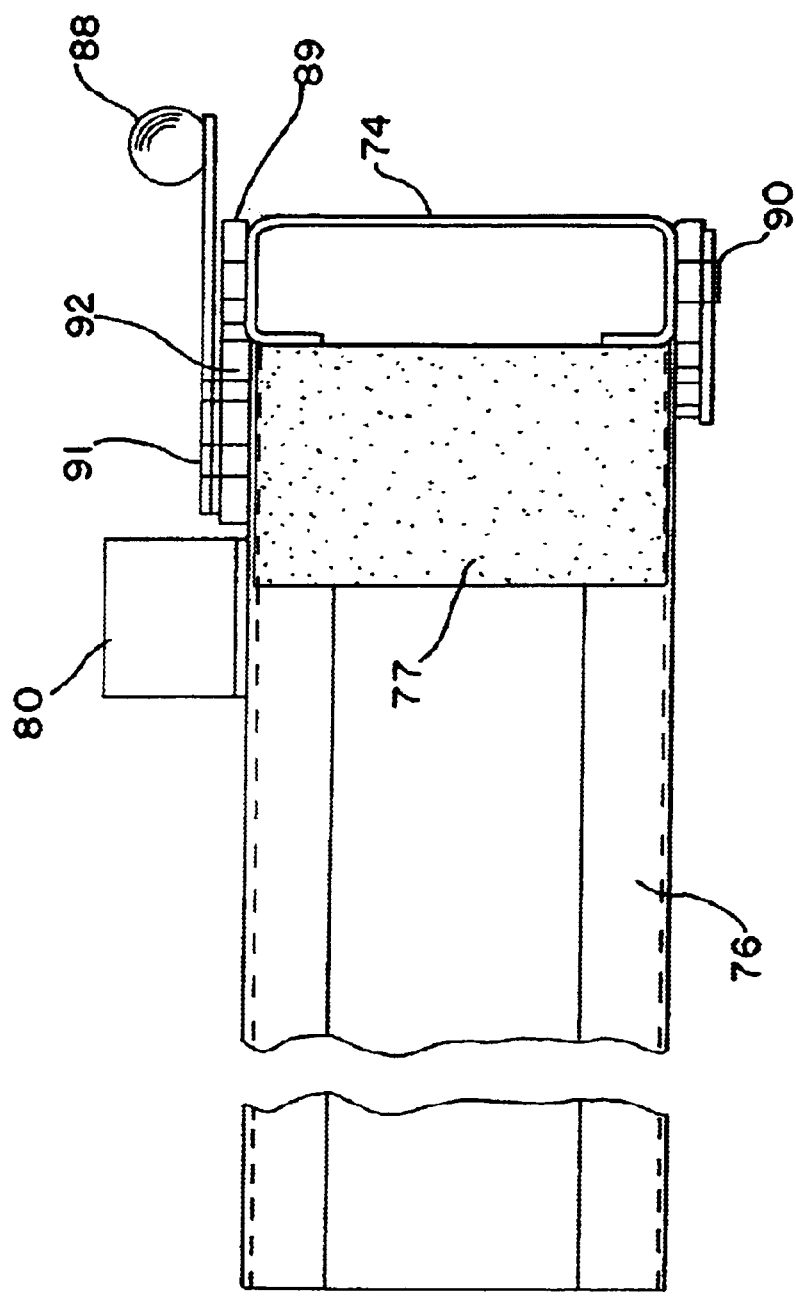
Figure 17:
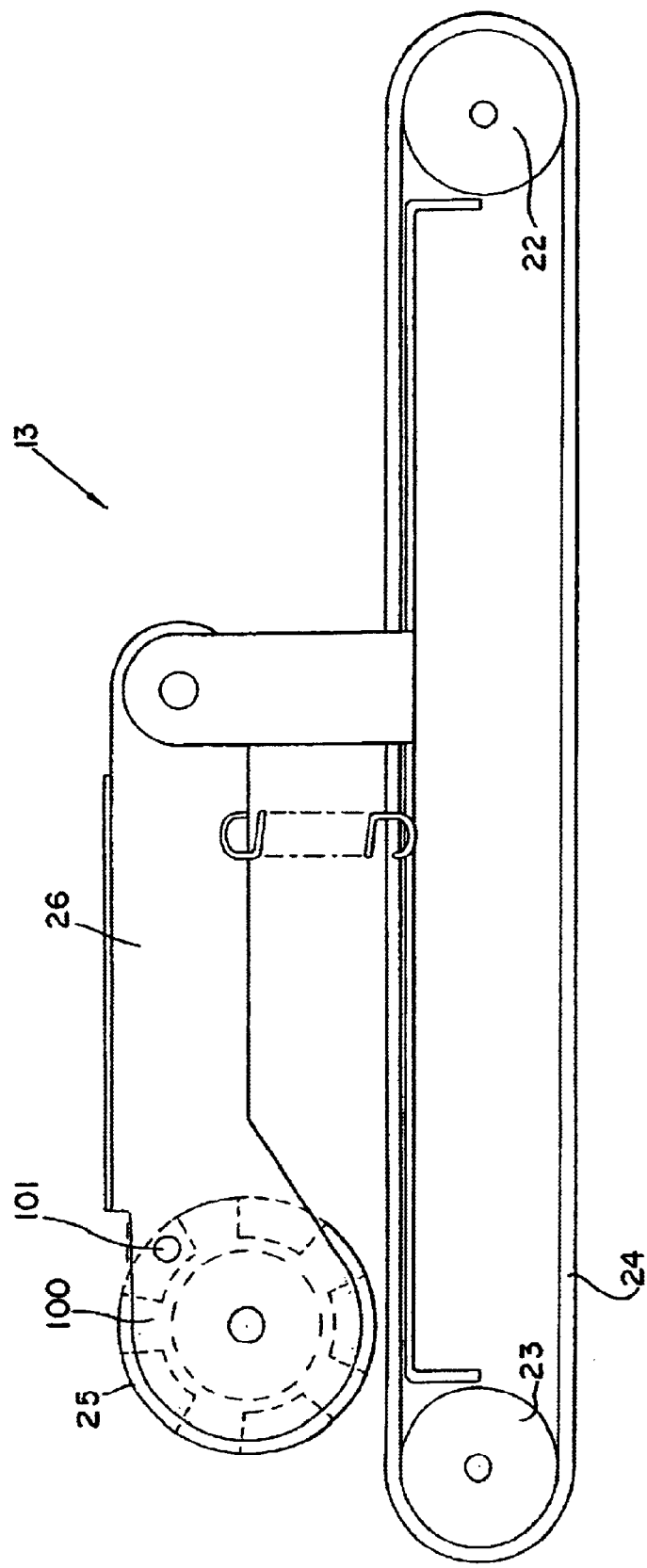

One preferred embodiment of the invention is now described in conjunction with the enclosed drawings:

FIG. 1 is a sectional side view of apparatus according to the present invention, FIG. 2 is an end view of the FIG. 1 apparatus, FIG. 3 is a plan view of the FIG. 1 apparatus, FIG. 4 are cut-away side and end views of the gripper mechanism arrangement (jaws open), FIG. 5 is a cut-away end view of the gripper mechanism (jaws closed), FIG. 6 is the schematic pneumatic control system, FIG. 7 is the schematic control circuits arrangement, FIGS. 8, 9 and 10 show simplified side view of an operating sequence, FIG. 11 is a plan view of a truck in the engaged position, FIG. 12 is an end view of the truck in position, FIG. 13 is a cross section of the carriage assembly with motor driven transmission, FIG. 14 is a cross section of the carriage assembly with alternative pneumatic transmission, FIG. 15 is a plan view of the hinged clamping arm and its locking mechanism, FIG. 16 is a frontal view of the hinged clamping arm, FIG. 17 is a side view of an alternative conveyor/nip roller combination, FIG. 18 is a side view of an alternative truck arrangement, FIG. 19 and 20 are side and end views of a further truck arrangement.

With reference to FIGS. 1, 2 and 3. A fabricated main frame 1 is supported on a base 2 with four vertical legs 3 which provide a clear space below the main frame for the laundry work loads which may be in a truck or on a conveyor or provided in some other form. Two vertical panels 4 are located inside the main frame on which panels 4 two guide rails 5 are attached, a carriage 6 being arranged for substantially vertical travel up and down the said rails. A pair of flat belts 7 are anchored to the carriage and pass upwards and over a roller 8, the other end of the belts being wrapped around and attached to a pair of winch wheels 9 located on a drive shaft 10. A winding rotation of the shaft will winch the carriage upwards and reversal of the shaft will permit the carriage to fall freely downwards under its own weight. A gripping mechanism 11 is attached to the base of the carriage with its jaws 12 projecting from the bottom whereby they will make contact with any laundry work load placed below.

A discharge conveyor 13 is positioned at a suitable height with the receiving end of the conveyor located in front of the path line of the carriage and gripper assembly. This conveyor is mechanically oscillated in a vertical up and down arcuate motion. Air jet means 14 transfer a gripped article from its suspended position in the jaws of the gripper on to the discharge conveyor. These jets are located at the rear of the path line of the carriage assembly which passes upwards between them and the discharge conveyor and are pivotally mounted with mechanical linkage 15 to move in synchronism with the oscillating motion of the conveyor. A pneumatic cylinder 17 with a relatively short stroke is fitted with a gear rack 18 meshed with a pinion 19 which is attached to the winch drive shaft 10. This rack and pinion transmission provides a lifting ratio of approximately 3.5 to 1 of the cylinder stroke to winch the gripper carriage assembly upwards on its guide rails. The carriage assembly is arranged to contact a pneumatic damping cylinder 16 at the top of its vertical travel which will cushion the rapid top of stroke impact and prevent inertia bounce. A pneumatic cylinder 20 is arranged in an appropriate position to contact the return stroke travel of the main drive cylinder 17 when its operating pressure is released and the weight of the falling carriage assembly unwinds the winch mechanism reversing the drive of the rack and pinion. The cylinder 20 is a suitable diameter and stroke to effectively cushion the downward travel of the carriage assembly and also counter balance its weight which will control its impact when it makes contact and rests upon the surface of the laundry work load.

The discharge conveyor 13 comprises a frame 21 supporting two rollers 22 and 23. The roller 22 provides the drive to a set of grip faced belts 24. A third free running roller 25 is pivotally mounted on two spring loaded arms 26 and rests upon the upper surface of the conveyor belts 24 and roller 23 thereby providing a powerful nip which will grip the fabric of an article and draw it on to the conveyor from where it will be discharged. The complete conveyor assembly is pivotally mounted on the shafts extended from each end of the roller 22. A pair of free running flanged pulleys 27 are suitably located on shafts 28 which project from each side of the conveyor frame, these align with a pair of eccentric flanged pulleys 30 fixed to a powered drive shaft 29 located above the conveyor. Endless belts 31 pass around these pulleys and support the pivotal weight of the conveyor assembly. Shaft 29 is driven at a desirable speed by an electric motor 32, resulting in an up and down cranking action with produces a rapid oscillating effect of the conveyor assembly. This shaft also transmits drive to the conveyor roller 22 via a torque limiting device.

With reference to FIGS. 4 and 5, the gripper mechanism comprises a small pair of jaws 33 and a larger more powerful pair of jaws 34. The small jaws 33 are powered to close by an air cylinder 35 and are opened by a spring 36. The jaws 33 are supported on a frame 37 located inside the opening mouth of the large jaws 34. The large jaws are hinged on pivots 38 and are opened and closed by air cylinders 39; due to the pivotal arrangement of those jaws they will follow an arcuate path and wrap themselves around the smaller jaws gripping the suspended fabric at a substantially lower point providing a greater hold by which to extract the article from the laundry pile. The complete assembly is housed in a casing 40 which is attached to the carriage 6 which moves it up and down. The pneumatic and electrical supplies for the mechanism are fed through conventional energy chain which supports the flexible travel of the cable and tube for these services. FIG. 4 shows the jaws in an open position, FIG. 5 shows them in a closed position.

With reference to FIG. 6, schematic pneumatic circuits detailed in the rest position. The initiating coils of all the solenoid valves are sequentially operated by output signals from an electronic C.P.U. The three port solenoid valve 41 applies air pressure to the winch drive air cylinder 17 via the pressure regulator valve 42, adjustment of this air pressure controlling the lifting force which extracts an article out of the laundry pile and it is adjusted to apply a force which will not tear the fabrics. Pressure is fed to the air cylinder 16 via a pressure regulator 43 adjusted to provide effective damping control of the carriage assembly as it strikes the top of its uplift travel. Solenoid valve 46 applies the air pressure to cylinder 20 which controls the downward fall of the carriage assembly, this pressure being suitably adjusted by the regulator 45. Pressure build up during the damping action is relieved by the adjustable relief valve 47. The solenoid valve 50 supplies air pressure to the air cylinder 35 which closes the small gripper jaws. The solenoid valves 48 and 49 supply the pressure to the air cylinders 39 which open and close the large gripper jaws, these valves being arranged for independent operation. Valve 48 opens the jaws and valve 49 close them. This permits the opening pressure of the cylinders to be exhausted immediately when the grippers contact the laundry, and results in a more rapid closure of the large jaws when the carriage has been moved up the required distance from the laundry pile with an article held in the small jaws. The solenoid valve 51 is initiated at the appropriate time to discharge a brief blast of compressed air from the air jets which will direct the suspended fabric on to the discharge conveyor simultaneously with its release by the gripper jaws.

With reference to FIG. 7 control circuits: electricity from a main is connected to control box 52 which provides a low voltage power supply to the C.P.U. 54 and its connected components. The high voltage supply for motor 32 is also provided from this control box via a pair of reversing circuit contactors operated by the C.P.U. outputs to coils 55 and 56. The switching inputs to the C.P.U. comprise two push buttons 59 and 60 manually operated to start or stop the automatic sequences. A switch 61 is operated when the winch and mechanisms are at the top of stroke position. Photo cell sensor 62 (or a row of sensors 62) scans and signals the presence of an article presented to the discharge conveyor 13. An encoder 57 is driven to synchronise with the rotation of the winch shaft 10 which signals the travelling location of the gripper mechanisms and also when they stop moving.

The outputs from the C.P.U. switch the coils of the six solenoids valves 41, 46, 48, 49, 50 and 51 which control the sequences of the pneumatic systems. A relay 63 interfaces to switch a fail safe electric brake 64 anchored to the winch drive shaft 10. The brake can be manually released by switch 65 which overrides the C.P.U. and is so applied in the event of air pressure failure by a pneumatically operated switch 67.

A description of the operating sequences follows. With the machine at rest the winch and gripper mechanisms are held in the top stroke position by pressure in the cylinder 17 via valve 41. The automatic cycle is initiated by a manual operation of the start button 59. Air pressure is exhausted from cylinder 17 via valve 41 and the gripper mechanisms 11 will fall downward under its gravitational weight, rotating the encoder as it falls. At a predetermined position in the downward travel the cylinder 17 mechanism makes contact with cylinder 20 which has been pressurised via solenoid valve 46 and this provides a cushioning effect to the rapidly free falling mechanism which controls and balances its weight by expelling the pressure increase in cylinder 20 via the adjustable pressure relief valve 47. When the gripper mechanism is arrested upon impact with the laundry pile the encoder will cease to rotate and the pick up sequences are initiated as follows: valve 50 pressurises cylinder 35 closing the small gripper jaws upon the fabric it has randomly made contact with. Valve 46 exhausts pressure from damping cylinder 20. Valve 48 exhausts pressure from cylinders 39 which hold the large jaws 34 open. Valve 41 is then operated to pressurise the winch cylinder 17 which will winch the gripper mechanisms upwards and rotate the encoder. After a short predetermined upward travel measured by the encoder the gripped portion of fabric is extracted from the laundry pile and valve 49 pressurises the two cylinders 39 rapidly closing the large jaws in a firm grip on the suspended portion of the fabric. The article is drawn upwards until it is in the top of stroke position and switch 61 is operated. The article now hangs suspended between the air jets 14 and the discharge conveyor 13 with its tail breaking the scan path of photocell 62. A brief operation of the air jets via valve 51 simultaneously with release of the article by the gripper jaws via valves 48, 49 and 50 will direct and release the fabric suspended from the oscillating conveyor into the nip of its grip rollers which will discharge the article from the machine. The pick up cycle will be automatically repeated when the tail portion of the article has cleared the scan path of the photo cell. In the event of the gripper jaws failing to pick up an article the photo cell scan path will not be broken and the cycle will immediately repeat.

When overloads occur due to heavily tangled laundry conditions the control system will automatically be adjusted to the following change of sequence: the winch drive cylinder will stall during the uplift operation and the encoder will stop rotating, the gripper jaws will open and release the article to fall back into the laundry pile. Simultaneously the fail safe brake will engage and the pressure in the winch drive cylinder will be exhausted. The laundry pile will be moved a short distance, the brake will disengage and the gripper mechanism will fall downwards to engage with another part of the laundry pile and the lifting cycle will recommence.

In the event of the discharge conveyor failing to clear a tangled fabric mass which has been engaged between its nip rollers the photo cell scan path will remain broken. In the event of a blockage, either the conveyor will be stopped after a permitted clearance time has elapsed or the conveyor will already have stopped by virtue of the blockage overriding the torque limiting device of the conveyor. The conveyor is then reversed thereby discharging the blockage back into the pile, and the automatic cycle will then resume operating with the conveyor being switched to the forward direction.

Positioning of the laundry to be processed can be achieved by conventional conveyor means, or mobile hand trucks or bins. The conveying means can be arranged to automatically control the laundry load position and stop; move forward to feed in new work loads; or reverse to reposition said loads. Hand trucks can be engaged with mechanisms which will provide a series of controlled stop, start and reverse movements which ensure efficient pick up of the contents of the truck. Additional outputs from the C.P.U. e.g., switching relay 65 can be arranged to control switching sequences to operate the above mentioned auxiliary equipment.

FIGS. 8, 9 and 10 show the simplified pick up sequences of a laundry article from the work load in a hand truck, without showing the gripping and oscillating sequences.

With reference to FIG. 11, a power driven carriage assembly 71 is mounted on a support member 72 comprising upper and lower track bars 73 along which the carriage is guided. Two clamping arms 74 and 75 project from each end of the carriage assembly 71, these arms being mounted on supporting members 76 which slide into the body of the carriage and which can be adjusted and anchored to suit the dimension of various sizes of trucks. Substantial rubber thrust pads 77 are attached to the working faces of the clamps and provide a flexible grip on the ends of a positioned truck 78. The clamping arm 74 is hingedly mounted on its supporting member 76 and can be opened to permit a truck to be easily wheeled into location then it is closed and locked (see FIG. 15) to clamp the truck into the carriage assembly. The clamp arm 75 is welded to its support member 76 although a hinged arm could alternatively be attached to both ends of the carriage.

Travel limiting photo sensor switches 79 are located in the required positions on the support member 72, these switches are operated by reflective flags 80 attached to the adjustable clamp arm support members 76. When the carriage 71 reaches its permitted travel position in either direction the operation of sensors 79 automatically reverse the direction of drive resulting in a forward and backward movement of the carriage assembly during its operating sequences.

A guide rail 81 is located on the machine frame on the opposing side to the carriage mechanism and this is set to provide space for the width of the truck to pass and will prevent it from disengaging from the clamps when it is moved.

With reference to FIG. 12 this is an end view showing the truck 78 free standing on its wheels with the clamp arm 74 closed and locked into position. Operation of the carriage drive will propel the truck on its own wheels.

With reference to FIG. 13 this is a cross section through the central line of the mechanisms. The carriage 71 is supported on the member 72 and is guided along the track bars 73 by upper and lower bearing slide blocks 83 which are attached to the carriage 71. A suitable length of gear rack 84 is fixed to the underside of the carriage frame and is meshed with a pinion 85 attached to the drive shaft of a general motor 86, which is located on the support member 72. Operation of the motor will drive the carriage along the track.

FIG. 14 is substantially the same mechanical constriction as FIG. 13. The rack and pinion drive, however, is replaced by a suitable rodless air cylinder 87 and this is attached to support member 72 and extends along the underside of the carriage frame. A simple post projecting from the moving saddle of the cylinder engages with a hole in the frame of the carriage and imparts the thrust of the cylinder to drive the carriage. A pair of suitable solenoid valves control the forward and backward movement required.

FIG. 15 shows a plan view of the hinged clamp arm arrangement. A notched hinge block 89 is attached to the clamp arm 74 and is pivoted on pin 90. A lever 88 pivoted on pin 91 moves a pawl 92 which is arranged to engage with the notch in the hinge block 89, this pawl locking the clamp arm 74 in position. Disengagement of the pawl permits the clamp arm to be opened. The location of the reflector flags 80 which operate the photo sensors 79 is also shown on this drawing.

FIG. 16 is a front view of the hinged clamp arm assembly and also shows the location of the reflector flag 80 on the clamp arm support member 76.

The truck moving apparatus and the guide rail 81 are attached to the base frame support legs 3 of the machine by simple angle brackets 94 which provide some desirable adjustability. The machine's programmable logic controller (PLC) is programmed to initiate the desired travel sequences of the truck in response to the following operating situations of the machine:

1. The pick up head has executed a pre-set number of effective grip and pick up cycles: the truck is moved to a new position.
2. The pick up head fails to grip and extract an article from the laundry pile: the truck immediately moves to a new position.
3. An overload occurs during the pick up operation and the gripper jaws release the laundry which drops back into the pile: the truck immediately moves to a new position.
4. After a pre-set number of failures to pick up any articles: This condition signifies that the truck has been effectively emptied: the truck is moved to the "start position", the operating cycles will cease, a visualaudio alarm will be operated. The truck can then be removed and replaced by another one and the operating cycle restarted.

FIG. 17 shows an alternative arrangement of conveyor 13 in which the nip roller 25 is still pivotally mounted on spring loaded arms 26 so as to rest on the upper surface of the conveyor belts 24 and roller 23. In this arrangement the nip roller 25 is provided with an integral encoder disc 100 and a sensor 101. When a piece of laundry has been transferred to the conveyor 13 and the laundry is too tangled then the nip roller 25 will stop rotating. This lack of rotation will be detected by the encoder disc 100/sensor 101 combination and the drive for the conveyor 13 can be stopped and reversed so as to discharge the piece of laundry back into the pile. This method of detecting a conveyor blockage is an alternative to the use of the photocell 62 scan path discussed above. In addition, the nip roller 25 could be replaced by a short length of nip conveyor positioned to run on top of the belts of the discharge conveyor belts 24.

The arrangements described above show the apparatus located above a truck 78 which is filled with laundry and moved manually into position below the gripping mechanism 11. The truck 78 is then clamped into the carriage assembly 71 which then moves the truck according to the control system of the apparatus.

FIG. 18 shows a variation on this idea. In FIG. 18 the truck 78 is provided on rails 105 which in a preferred embodiment comprise two parallel rails 105. These extend from below a remote laundry hopper 106, which may be fed from a feed conveyor 107 or an overhead rail feed system 108, to the separating apparatus. When the truck 78 is filled a drive system associated with the truck 78 moves the truck along the rails into position below the gripping mechanism. The control system of the separating apparatus can be linked to the drive system of the truck 78 so as to control the movement of the truck, and hence the pile of laundry, between cycles of the gripping mechanism.

One suitable drive system may comprise a toothed rack extending the length of the rails 105 and a motor driven pinion mounted on the truck. The power supply to the motor being controlled by the control system of the separating apparatus.

Although the rails 105 are shown in FIG. 18 as being mounted on the floor 110, they could be raised off the ground and possibly attached to the frame 1 of the separating apparatus and/or hopper as shown in FIGS. 19 and 20. The truck 78 sits on the raised rails, effectively suspended therefrom above the ground.

A sensor 109 can also be provided in the truck 78 to monitor the level of the pile of laundry. When the level is low then the control system moves the truck back along the rails 105 to the hopper 106 to receive another load.

It will be readily appreciated that other alterations and modifications will be possible without departing from the basic aspects of the present invention.

What is claimed is:

1. Laundry separating apparatus for separating an article of laundry from a bundle of laundry articles, the apparatus comprising:
   a frame;
   a grip device mounted for guided movement towards and away from a bundle of laundry;
   a wheeled laundry truck in which the laundry articles are, in use, located;
   drive means for moving said grip device towards and away from said laundry; and
   moving means associated with the wheeled laundry truck for causing the truck to move relative to the frame beneath the grip device during the operation of the apparatus, the moving means operable to release the wheeled laundry truck.

2. The apparatus as claimed in claim 1 wherein the moving means moves the truck after a number of cycles of movement of the grip device towards and away from the bundle determined by control means, the grip device being actuated to grip an article of laundry at the lowermost point in its cycle of movement.

3. The apparatus as claimed in claim 1 wherein the moving means comprises a carriage and the truck is wheeled for free movement on the ground and, in use, is releasably clamped relative to the carriage which is mounted on the frame for forward and backward movement relative thereto.

4. The apparatus as claimed in claim 1 wherein the moving means comprises guide means extending between a truck loading position and a laundry separating position below the grip device, the truck being mounted on the guide means such that movement of the truck relative to the guide means results in movement of the truck relative to the grip device.

5. The apparatus as claimed in claim 4 wherein the guide means comprises a pair of guide rails.

6. The apparatus as claimed in claim 1 further comprising control means to coordinate the movement of the grip device and the truck relative thereto.

7. The apparatus as claimed in claim 6 wherein the control means moves the truck relative to the grip device if the grip device fails to grip an article of laundry.

8. The apparatus as claimed in claim 6 wherein the control means moves the truck relative to the grip device if the apparatus is unable to extract an article and the article is released back into the bundle.

9. The apparatus as claimed in claim 1 wherein the grip device moves substantially vertically towards and away from the truck, so as to suspend a gripped article of laundry.

10. The apparatus as claimed in claim 1 wherein the grip device has first and second pairs of gripping jaws, the first pair gripping a small part of the article of laundry and the second pair gripping a larger part of the article after the grip device has been moved a predetermined distance away from the bundle of laundry.

11. The apparatus as claimed in claim 10 wherein the jaws are pivotally mounted on a gripping carriage.

12. The apparatus as claimed in claim 11 wherein the axes of the jaw pivots are parallel to each other, the first jaws being mounted inside the second jaws.

13. The apparatus as claimed in claim 1 further comprising:
   a conveyor mounted adjacent the path of movement of said grip device;
   a nip roller mounted adjacent the conveyor to define therebetween a nip;
   transfer means for transferring a portion of the article of laundry into said nip; and
   control means for actuating the transfer means and actuating said grip device so as to release said article of laundry which is then conveyed by said conveyor.

14. The apparatus as claimed in claim 13 wherein the conveyor oscillates towards and away from the truck.

15. The apparatus as claimed in claim 13 wherein the transfer means comprises air jet means mounted on the other side of the movement path of the grip device to said conveyor and adapted to blow said portion of the article towards said nip.

16. The apparatus as claimed in claim 15 wherein the conveyor oscillates towards and away from the truck and wherein the air jet means are movably mounted so as always to be directed towards the nip.

17. The apparatus as claimed in claim 13 wherein the nip roller is biased into engagement with the conveyor and is provided with an encoder which detects a blockage in the nip of the conveyor by sensing when the nip roller is no longer rotating in a laundry removal direction and the control means operable to reverse the conveyor to remove the blockage before returning the conveyor to the laundry removal direction.

18. The apparatus as claimed in claim 13 wherein a sensor is provided to detect the presence of the gripped suspended article of laundry, the sensor being linked in the control means to actuate the transfer means, to release the article from the grip device and to detect clearance of a removed blockage.

19. The apparatus as claimed in claim 1 wherein there is provided drive means for lifting the grip device away from the truck, which drive means allows the grip device to fall under gravity towards the truck, and sensor means to determine the lowermost point of the movement of the grip device towards the laundry so as to actuate the grip device to grip an article and to actuate the drive means to lift the grip device and the gripped article away from the bundle of laundry.

20. The apparatus as claimed in claim 19 wherein the drive means comprises a winch drum driven by means of a pinion fixed thereto and a cooperating rack connected to a pneumatic cylinder, exhaustion of which allows the grip device to fall under gravity.

21. The apparatus as claimed in claim 20 wherein there is further provided velocity regulating means in the form of a damping cylinder which is engaged at a predetermined point in the gravity movement of the grip device by an arm which extends from the rack.

22. An apparatus for positioning a laundry truck containing at least one laundry article for gripping by a laundry separator, the system comprising:
    a frame; and
    a drive operatively connected with the laundry truck, the drive operable to moveably position the laundry truck relative to the frame;
    wherein the laundry truck is positionable in a first position away from the frame and in a second position adjacent the frame.

23. The apparatus of claim 22 further comprising:
    a moveable carriage connected with the frame; and
    a releasable clamp operatively connected with the moveable carriage, the releasable clamp operable to clamp the laundry truck;
    the drive operable to move the movable carriage relative to the frame, wherein the carriage movement is communicated to the laundry truck, the first position corresponding to the laundry truck being unclamped from the releasable clamp.

24. The apparatus of claim 22 further comprising:
    a rail operable to guide the laundry truck, the laundry truck connected with the rail in the first and second positions.

25. The apparatus of claim 22 further comprising:
    a gripping device moveably connected with the frame;
    a controller for coordinating movement of the laundry truck near or at the second position relative to movement of the gripping device.

26. The apparatus of claim 25 further comprising a sensor to determine the lowermost point of the movement of the gripping device towards the laundry truck so as to actuate the gripping device to grip the at least one laundry article and to actuate lifting the grip device and the gripped laundry article away from the laundry truck.

27. The apparatus of claim 25 further comprising:
    a conveyor operatively connected to the frame, a first end of the conveyor adjacent a first path of movement of the gripping device and a second end of the conveyor spaced away from the first path of movement; and
    a nip operable to hold an article of laundry adjacent to the conveyor, the nip at the first end of the conveyor.

28. The apparatus of claim 22 wherein the drive is operable to move the laundry truck both forward and reverse relative to the frame in the second position adjacent the frame.

29. A laundry separation method for positioning a laundry truck containing at least one laundry article for gripping, the method comprising the steps of:
    (a) placing the at least one laundry article in the laundry truck;
    (b) placing the laundry truck from a first position spaced away from a gripping device to a second position adjacent the gripping device;
    (c) moving the laundry truck relative to movement of the gripping device; and
    (d) releasably clamping the laundry truck to a moveable carriage mounted to a frame, the gripping device operatively connected with the frame;
    wherein step (c) comprises moving the moveable carriage relative to the frame.

30. A laundry separation method for positioning a laundry truck containing at least one laundry article for gripping, the method comprising the steps of:
    (a) placing the at least one laundry article in the laundry truck;
    (b) placing the laundry truck from a first position spaced away from a gripping device to a second position adjacent the gripping device; and
    (c) moving the laundry truck relative to movement of the gripping device; wherein:
    step (b) comprises moving the laundry truck along at least one rail; and
    step (c) comprises moving the laundry truck along the at least one rail.

31. A laundry separation method for positioning a laundry truck containing at least one laundry article for gripping, the method comprising the steps of:
    (a) placing the at least one laundry article in the laundry truck;
    (b) placing the laundry truck from a first position spaced away from a gripping device to a second position adjacent the gripping device; and
    (c) moving the laundry truck relative to movement of the gripping device; wherein (c) comprises moving the laundry truck both forward and in reverse relative to the gripping device in the second position.

32. A conveyor apparatus for separating at least one article of laundry from a bundle of laundry articles, the conveyor system comprising:
    a frame;
    a conveyor comprising a shaft pivotably connected with the frame;
    a nip formed with the conveyor;
    a means for oscillating the conveyor and the nip about the shaft;

a clamp operable to move an article of laundry between the bundle and the conveyor;

a moveable carriage;

a releasable clamp operatively connected with the moveable carriage and adapted to hold a laundry truck in a position adjacent a path of travel of the clamp; and a moving means operable to move the carriage relative to the clamp, wherein the laundry truck moves in response to the movement of the carriage.

33. A laundry separating apparatus for separating an article of laundry from a bundle of laundry, said apparatus comprising:

a grip device mounted for guided movement towards and away from the bundle of laundry;

a drive for lifting the grip device away from said bundle; and a sensor for determining the lowermost point of the movement of the grip device towards the laundry so as to actuate the grip device to grip an article of laundry and to actuate the drive to lift the grip device and the gripped article away from the bundle of laundry, the grip device having first and second pairs of gripping jaws, the first pair gripping a small part of the article of laundry and the second pair gripping a larger part of the article after the grip device has been moved a predetermined distance away from the bundle of laundry;

wherein the bundle of laundry articles and the path of movement of the grip device are movable relative to each other so that the grip device can contact different areas of the bundle.

34. A laundry separating apparatus for separating an article of laundry from a bundle of laundry, said apparatus comprising:

a grip device mounted for guided movement towards and away from the bundle of laundry;

a drive for lifting the grip device away from said bundle; and a sensor for determining the lowermost point of the movement of the grip device towards the laundry so as to actuate the grip device to grip an article of laundry and to actuate the drive to lift the grip device and the gripped article away from the bundle of laundry, the grip device having first and second pairs of gripping jaws, the first pair gripping a small part of the article of laundry and the second pair gripping a larger part of the article after the grip device has been moved a predetermined distance away from the bundle of laundry;

wherein the bundle of laundry is located, in use, in a truck which has associated moving means for causing the truck to move beneath the grip device during the operation of the apparatus.

35. The apparatus as claimed in claim 34 wherein the moving means moves the truck after a number of cycles of the grip device towards and away from the bundle determined by the control means, the grip device being actuated to grip an article of laundry at the lowermost point in its cycle of movement.

36. The apparatus as claimed in claim 35 wherein the moving means comprises a carriage and the truck is wheeled for free movement on the ground and, in use, is releasably clamped to said carriage which is mounted on the frame of the apparatus for forward and backward movement relative thereto.

37. A laundry separating apparatus for separating an article of laundry from a bundle of laundry articles, the apparatus comprising:

a grip device mounted for guided movement towards and away from said bundle to extract said article of laundry from said bundle;

a conveyor mounted adjacent the path of movement of said grip device;

a nip roller mounted adjacent the conveyor to define therebetween a nip;

transfer means for transferring a portion of said article of laundry into said nip; and control means for actuating the transfer means and actuating said grip device so as to release said article of laundry which is then conveyed by said conveyor wherein the bundle of laundry articles and the path of movement of the grip device are movable relative to each other so that the grip device can contact different areas of the bundle.

38. A laundry separating apparatus for separating an article of laundry from a bundle of laundry articles, the apparatus comprising:

a grip device mounted for guided movement towards and away from said bundle to extract said article of laundry from said bundle;

a conveyor mounted adjacent the path of movement of said grip device, a nip roller mounted adjacent the conveyor to define therebetween a nip;

transfer means for transferring a portion of said article of laundry into said nip; and control means for actuating the transfer means and actuating said grip device so as to release said article of laundry which is then conveyed by said conveyor;

wherein the bundle of laundry is located, in use, in a truck which has associated moving means for causing the truck to move beneath the grip device during the operation of the apparatus.

39. The apparatus as claimed in claim 38 wherein the moving means moves the truck after a number of cycles of the grip device towards and away from the bundle determined by the control means, the grip device being actuated to grip an article of laundry at the lowermost point in its cycle of movement.

40. The apparatus as claimed in claim 39 wherein the moving means comprises a carriage and the truck is wheeled for free movement on the ground and, in use, is releasably clamped to said carriage which is mounted on the frame of the apparatus for forward and backward, movement relative thereto.

41. A clamp apparatus for separating at least one article of laundry from a bundle of laundry articles, the clamp apparatus comprising:

a casing;

a first clamp having first jaws, the first clamp mounted in the casing;

a second clamp having second jaws, the second clamp mounted in the casing;

moveable carriage;

a releasable clamp operatively connected with the moveable carriage and adapted to hold a laundry truck in a position adjacent the first and second clamps; and a moving means operable to move the carriage relative to the first and second clamps, wherein the laundry truck moves in response to the movement of the carriage;

wherein the first jaws are in a substantially fixed position relative to the second jaws.

42. A method for separating at least one article of laundry from a bundle of laundry articles, the method comprising the steps of:

(a) moving first and second clamps to a position adjacent the bundle, the first clamp is in a substantially fixed position relative to the second clamp;

(b) gripping the at least one article of laundry with the first clamp;

(c) moving the first and second clamps away from the bundle of laundry articles;

(d) gripping the at least one article of laundry with the second clamp, the second clamp gripping around the first clamp after step (c);

(e) further extracting the at least one article of laundry from the bundle of laundry articles after step (d);

(f) clamping a laundry truck with a moveable carriage; and (g) moving the moveable carriage and the laundry truck relative to the first and second clamps in response to operation of the first and second clamps;

wherein the bundle is within the laundry truck.

* * * * *

UNITED STATES PATENT AND TRADEMARK OFFICE
CERTIFICATE OF CORRECTION

PATENT NO. : 6,655,890 B1
DATED : December 2, 2003
INVENTOR(S) : Henry John Weir It is certified that error appears in the above-identified patent and that said Letters Patent is hereby corrected as shown below:

Column 14,
Line 48, immediately after "backward" delete "," (comma).
Line 59, before "moveable" insert -- a --.

Signed and Sealed this

Twenty-eighth Day of December, 2004

JON W. DUDAS
*Director of the United States Patent and Trademark Office*